Figure 1:
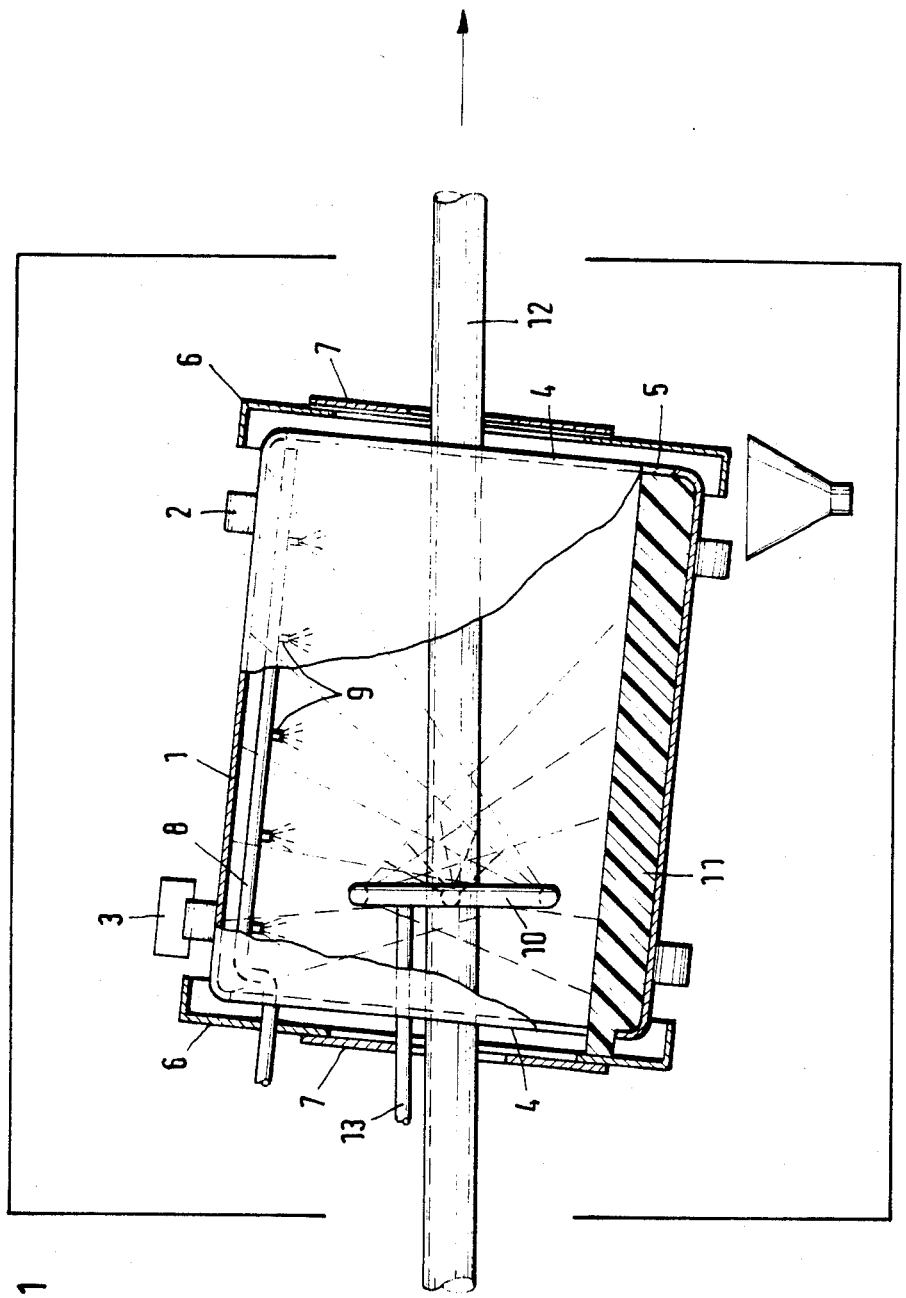

United States Patent [19]

Hillemanns et al.

[11] Patent Number: 4,520,047
[45] Date of Patent: May 28, 1985

[54] METHOD AND APPARATUS FOR THE RECOVERY OF SPRAYING SUBSTANCE WHEN SPRAYING ELONGATED ROLLED STOCK

[75] Inventors: Herbert Hillemanns, Ratingen; Robert Samans, Düsseldorf; Walter Meyer, Duisburg, all of Fed. Rep. of Germany

[73] Assignee: Mannesmann Aktiengesellschaft, Düsseldorf, Fed. Rep. of Germany

[21] Appl. No.: 370,531

[22] Filed: Apr. 21, 1982

[30] Foreign Application Priority Data

Apr. 22, 1981 [DE] Fed. Rep. of Germany ....... 3116368

[51] Int. Cl.³ .................... A21D 4/60; B05D 7/16; C10M 11/00
[52] U.S. Cl. .................... 427/331; 427/345; 427/421; 427/8
[58] Field of Search ............ 427/345, 424, 421, 331, 427/8; 118/326, DIG. 7, 634, 602

[56] References Cited

U.S. PATENT DOCUMENTS

| 2,734,480 | 2/1956 | Norris | 118/326 |
| 2,854,946 | 10/1958 | Norris | 118/324 |
| 3,741,155 | 6/1973 | Hunder | 118/326 |

FOREIGN PATENT DOCUMENTS 2823958 12/1979 Fed. Rep. of Germany ...... 118/326

Primary Examiner—Sam Silverberg
Attorney, Agent, or Firm—Ralf H. Siegemund

[57] ABSTRACT

The invention relates to a method and an apparatus for the recovery of spraying substance when spraying elongated rolled stock. Difficulties are met when trying to recover water-dilutable or water-soluble coating agents since after evaporation of the solvent, i.e. the water, the film which is left can no longer be dissolved by water and thus it is no longer possible to recover this fraction of the spraying substance. According to the invention, therefore, it is proposed to carry out the spraying in a water-saturated atmosphere so that the excess spraying substance can easily be recovered. The apparatus is appropriately constructed to correspond to these circumstances.

3 Claims, 2 Drawing Figures

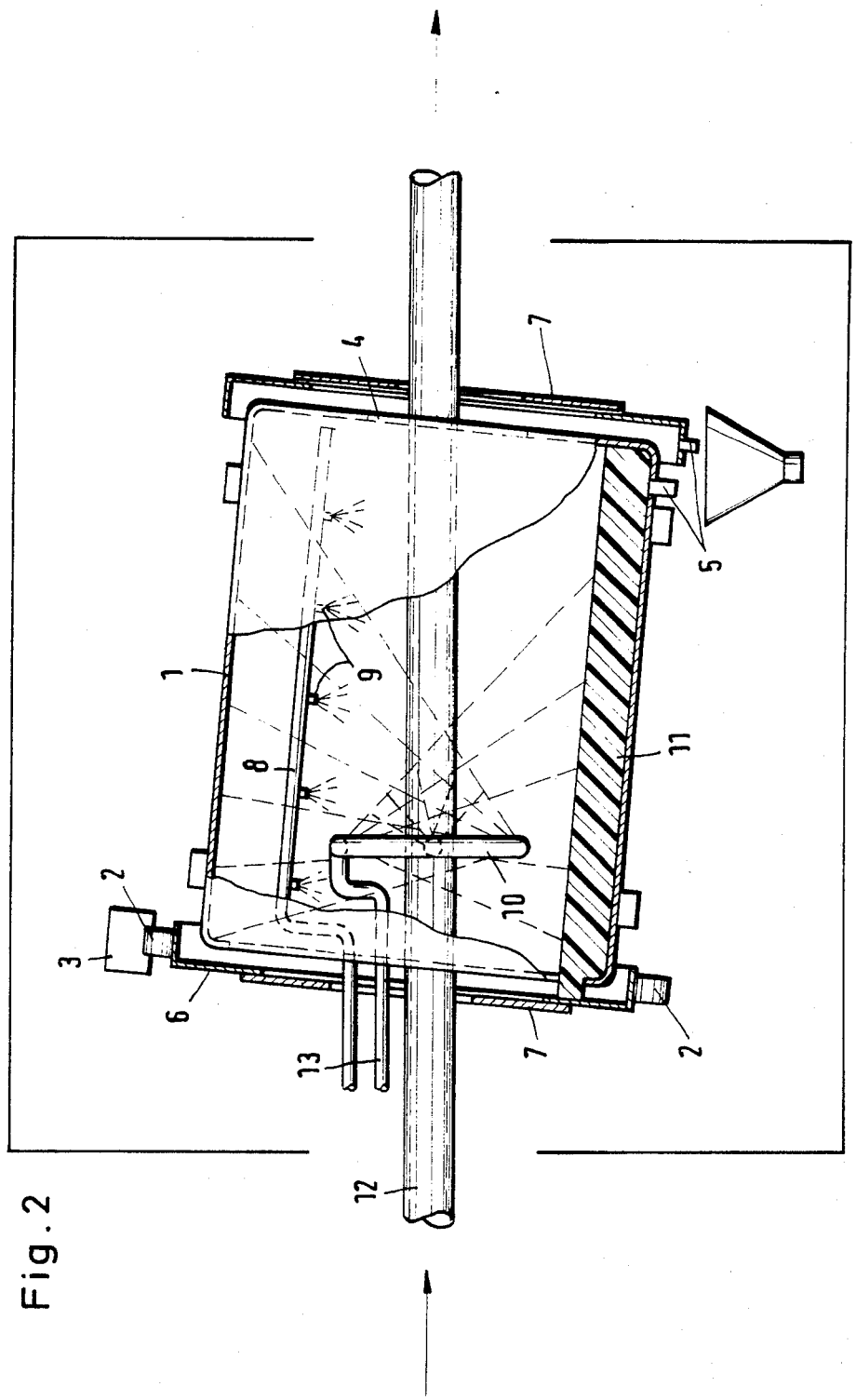

METHOD AND APPARATUS FOR THE RECOVERY OF SPRAYING SUBSTANCE WHEN SPRAYING ELONGATED ROLLED STOCK

The invention relates to a method for the recovery of excess spraying substance when elongated rolled stock is subjected to a continuous spraying process, more particularly when spraying tubes with corrosion-inhibiting coating materials comprising substantially a binder, pigments, tar substances and also water as solvent or dispersant, and also to an apparatus for carrying out the method.

As is known, when spraying tubes in a spraying chamber, coating materials are used which contain solvents, the addition of solvents allowing re-use. For reasons connected with protecting the environment the use of organic solvents involves considerable additional outlay e.g. subsequent burning arrangements.

Furthermore a loss of spraying substance occurs when spraying flat-surfaced sections with coating materials containing water and/or solvents when using conventional airless spraying, compressed-air spraying, or a mixed spraying method, since some of the spray goes past the article being coated and is thus lost.

The use of water-dilutable or water-soluble coating materials has only been possible hitherto if the user substantially gave up the idea of re-using the excess substance. An obstacle to re-use was that when there is a normally unavoidable loss of water as solvent the binder can no longer be brought back to a sprayable condition as a result of coagulation. The basic behaviour of a coating which uses water as solvent or dispersant is that after the evaporation of the water the film which remains behind can no longer be dissolved by water.

The invention has as its object to provide a method which allows the recovery of even coating materials which are dilutable with water or water-soluble.

To achieve this object according to the invention a method and an apparatus are proposed according to which recovery is made possible by spraying the object to be coated in water-vapor saturated atmosphere; this then permits collection of the excess spraying substance for purposes of reuse without encountering the problems outlined above.

The method according to the invention provides the necessary conditions for allowing re-use of an environmentally beneficial coating material which in the partly dried state cannot be changed back again to a sprayable state simply by the addition of water used as solvent.

When carrying out the method according to the invention, before introducing the stock which is to be sprayed the degree of saturation within the spraying chamber is brought to the necessary value i.e. a saturation value of almost 100%, and kept at the desired value by spraying-in water in very finely divided form (spray mist or vapour). This measure prevents impoverishment of the water which is used as solvent when there is excess spraying substance.

Recovery of this fraction of spraying substance is possible according to the invention since the spraying operation is carried out in a chamber and the excess spraying substance which collects by precipitation on the chamber walls can be taken therefrom and passed back to the spraying operation either directly or after a preparation process.

Possible constructional forms of an apparatus according to the invention are shown diagrammatically in the accompanying drawings, wherein:

FIG. 1 shows an apparatus with a rotatable drum, and
FIG. 2 shows an apparatus with a stationary drum.

In these drawings the spraying drum 1 which is driven rotatably by rollers 2 by means of a drive element 3 is moved about the stock which is to be sprayed. The spraying drum 1 is opened at both ends 4 to such an extent as to allow the spraying nozzles fixed to a conduit 8 and also, separately therefrom, spraying nozzles 10 and a stripper element 11 to project into the drum.

The spraying drum 1 is provided at the ends with a bent-over flange 5 which serves as an overflow element for the spraying substance. At both ends the drum is provided with stationary cover plates 6 which both shield the open ends partially and also serve for the mounting of the conduit 6 and the stripper 11. The apertures 13 which are provided in the cover plates 6 are closed to a substantial extent adapted to the particular material being dealt with, by front plates 7 which are adjustable.

The continuous spraying of elongated stock which is carried out with the method according to the present invention, more particularly the spraying of tubes with corrosion-inhibiting coating materials, and the simultaneous recovery of excess spraying substance is effected by passing the stock 12 which is to be sprayed through the interior of a spraying chamber 1 which is inclined at an angle of 1°–10° downwardly relatively to the longitudinal axis of the stock.

Within the spraying drum 1 there are arranged at right angles to the surface of the stock 12 one or more spraying nozzles 8 whose jets uniformly cover the surface of the stock being sprayed.

The excess spraying substance produced in this operation collects on the internal drum wall. This excess spraying substance is taken off with the use of the stripper element 11 and collects in the bottom region of the spraying drum 1. Because the stripper 11 is situated in a slightly inclined position with respect to the longitudinal axis of the drum, the stripped-off coating material is continuously taken to the outside, where it is collected and can be re-used.

FIG. 2 shows a further possible way of collecting the excess spraying substance from the drum wall, consisting in arranging the cover plates to be rotatable instead of the drum, and the stripper element secured to the cover plates co-rotates and strips the spraying substance from the walls of the stationary drum.

The spraying nozzles arranged in the drum interior are inclined in their spraying direction relatively to the tube surface, so that the spraying direction is in the direction of the downwardly inclined drum end.

It is also possible to spray-in solvent or water additionally through stationary spraying nozzles projecting from the outside into the rotating spraying drum 1, so that premature drying of the spraying substance on the drum wall is inhibited by saturation of the drum atmosphere.

We claim:
1. Method for the recovery of spraying substance in the continuous spraying of elongated rolled stock, more particularly when spraying tubes with corrosion-inhibiting coating materials, including substantially a binder, pigments, tar substances, and water as solvent or dispersant, comprising spraying the stock in a water-vapor saturated atmosphere; collecting the excess spraying substance and providing for the collected substance for re-use.

2. Method according to claim 1, characterized in continuously monitoring the degree of saturation of the atmosphere and controlling saturation independence upon the monitoring to keep saturation continuously at a value near to 100% saturation.

3. Method as in claim 1, and including using a spraying drum at an inclination from 1 to 10 degrees.

* * * * *